UNITED STATES PATENT OFFICE.

ANSON L. MUNSON, OF FRESNO, CALIFORNIA.

PAINT.

SPECIFICATION forming part of Letters Patent No. 285,151, dated September 18, 1883.

Application filed June 5, 1883. (No specimens.)

*To all whom it may concern:*

Be it known that I, ANSON L. MUNSON, of Fresno, county of Fresno, State of California, have invented an Improved Paint Compound; and I hereby declare the following to be a full, clear, and exact description thereof.

My invention relates to a new and useful paint compound specially adapted for painting roofs, dipping shingles, and for use as a cement.

This compound consists of coal-tar, hydrochloric acid in which zinc is dissolved, litharge, plumbago, asphaltum, varnish, and gasoline. These ingredients are combined in the following proportions, namely: coal-tar, fifty gallons; saturated solution of hydrochloric acid and zinc, five pounds; litharge, fifteen pounds; plumbago, twenty-five pounds; asphaltum varnish, five gallons; gasoline sufficient to dissolve the litharge, plumbago, and asphaltum varnish.

In preparing this compound the solution of hydrochloric acid and zinc is first added to the coal-tar. The litharge, plumbago, and asphaltum varnish are dissolved in the gasoline, and this solution is then added to the first, when the whole is well macerated without heat.

This compound may be used as a paint by applying with a brush, or by heating it may be used as a dip for shingles, or by adding equal parts of litharge and plumbago until the required consistency is reached it may be used as a cement. As a paint it protects exposed metallic surfaces, preserves wood, may be used in coating cemented walls, as in underground cisterns, and as a coat for brick walls. As a dip, when hot, it protects shingles, and as a cement it closes up fractures in seams in tin and iron roofs, and stops leaks in returns and connections in tin, iron, and wood roofs. It adheres to smooth surfaces, and is strong and water-proof. It is elastic and withstands contraction and expansion of metals. It is durable, is unaffected by a considerable degree of heat, and will not crack or scale. It has no odor nor color when dry, and thus does not affect water passing over it.

I am aware of the existence of a patent to F. A. Stall (numbered 141,897) in which coal-tar, plumbago, and asphaltum are compounded and claimed; but I do not wish to be understood as claiming in this application any such compound.

Having thus described my invention, what I claim as new, and desire to secure by Letters Patent, is—

The herein-described compound to be used as a paint, a dip, and cement, consisting of coal-tar, saturated solution of chloride of zinc, litharge, plumbago, asphaltum varnish, and gasoline, substantially in the proportions specified.

In witness whereof I hereunto set my hand.

ANSON L. MUNSON.

Witnesses:
C. G. SAYLE,
CHAS. F. BURKS.